United States Patent [19]

Truskalo

[11] Patent Number: 4,587,465
[45] Date of Patent: May 6, 1986

[54] DYNAMIC FOCUS CIRCUIT

[75] Inventor: Walter Truskalo, Hopewell Township, Mercer County, N.J.

[73] Assignee: RCA Corporation, Princeton, N.J.

[21] Appl. No.: 676,816

[22] Filed: Nov. 30, 1984

[51] Int. Cl.[4] ............................................. H01J 29/58
[52] U.S. Cl. ...................................... 315/382; 358/218
[58] Field of Search ................. 315/382, 408; 358/218

[56] References Cited

U.S. PATENT DOCUMENTS

| 2,918,602 | 12/1959 | Fyler et al. | 315/22 |
| 3,146,373 | 8/1964 | Janssen | 315/22 |
| 4,316,128 | 2/1982 | Shiratsuchi | 315/411 |
| 4,460,851 | 7/1984 | Bistline et al. | 315/382 |

FOREIGN PATENT DOCUMENTS

| 534826 | 6/1976 | Japan . |
| 52-164419 | 6/1976 | Japan . |
| 5414118 | 6/1977 | Japan . |
| 5436123 | 8/1977 | Japan . |

OTHER PUBLICATIONS

Electrical Schematic of a Sony Color Television Receiver, Model KV-1813.

Primary Examiner—Theodore M. Blum
Attorney, Agent, or Firm—Paul J. Rasmussen; Peter M. Emanuel; Adel A. Ahmed

[57] ABSTRACT

A dynamic focus circuit for a television display picture tube provides a focus voltage having scan rate modulation. The parabolically shaped voltage which is produced across the S-shaping capacitor in a deflection system is coupled by a transformer having a primary winding coupled between the junction of the S-shaping capacitor and the deflection winding and a power supply point having substantially the same average DC potential. Substantially no DC current flows through the transformer primary winding, which permits a relatively small transformer to be used without saturation of the magnetic core and without the need for a coupling capacitor for DC isolation.

13 Claims, 1 Drawing Figure

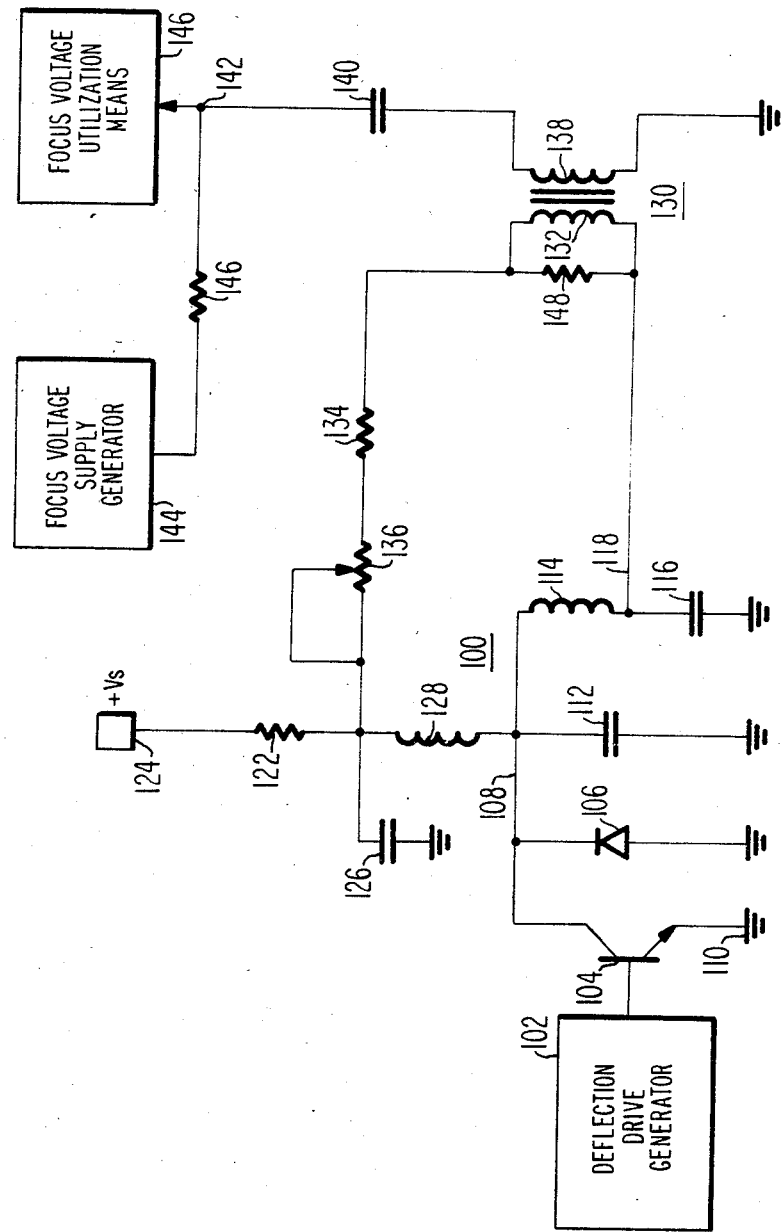

DYNAMIC FOCUS CIRCUIT

The present invention relates to modulated focus voltage circuits for television display picture tubes.

In typical television display picture tubes, electron beam defocussing tends to occur near the screen edges. It is desirable to maintain sharp focus near the screen edges, particularly when displaying alphanumeric characters, since such characters may be displayed on the picture tube screen at positions near the screen edges.

To provide sharper focusing of the electron beams landing near the screen edges, focus voltage modulating circuits are employed to vary the picture tube focus voltage from a substantially DC voltage to one which includes parabolically shaped components repeating at the line and frame scanning rates.

In a typical television picture tube deflection system, such as the horizontal or line deflection system of a conventional television receiver, a parabolically shaped signal repeating at the scan rate is produced across the capacitor commonly coupled in series with the deflection winding or yoke for providing the dual function of DC blocking and S-shaping. In general, however, the parabolically shaped voltage across the S-shaping capacitor is not suitable for direct application to the picture tube focus electrode, since its amplitude is too small and its polarity direction is opposite to that generally required. Conventional focus voltage modulating circuits use a transformer to step up the voltage and to invert the polarity direction. However, as has been mentioned, the S-shaping capacitor also serves to block the DC operating voltage which is required for the deflection circuit. In order to prevent this relatively high DC voltage from being applied across the transformer primary winding and thereby degrading the magnetic core characteristics through saturation, conventional focus voltage modulating circuits of this type typically employ a blocking capacitor. Such a capacitor is required to have a sufficiently large value to couple the parabolically shaped voltage and it must also withstand the DC voltage component.

A horizontal deflection system of a conventional television receiver typically includes, in parallel combination, one or more switches, a retrace capacitor, and a deflection winding coupled in series with the S-shaping capacitor. DC power is supplied to the parallel combination by way of an inductance. In accordance with an aspect of the invention, one end of a transformer primary winding is coupled to the point of series connection of the deflection winding and the S-shaping capacitor and the other end of the primary winding is coupled to the DC power supply such that the average DC potential at each end of the primary winding is substantially the same as the power supply operating potential. The parabolically shaped horizontal scan rate voltage appearing across the secondary winding is combined with a further voltage to provide a focus voltage having scan rate modulation.

The sole FIGURE shows partly in block diagram form and partly in circuit schematic form a dynamic focus system including a preferred embodiment of the present invention.

In the dynamic focus circuit of the FIGURE, a conventional horizontal deflection system of a typical television receiver is generally designated as 100. The deflection system includes a deflection drive generator 102 for supplying switching signals to the base of a transistor 104 which, together with the oppositely poled and parallel coupled diode 106 forms the "deflection switch". The "deflection switch" is coupled between a circuit point 108 and a point of common potential, here conveniently designated as a ground 110. Also coupled between circuit point 108 and ground are retrace capacitor 112 and the series combination of a deflection winding 114 and an S-shaping and DC blocking capacitor 116, which are coupled in series at a circuit point 118, one plate of S-shaping capacitor 116 being coupled to ground. A DC operating potential is provided at circuit point 120 by way of a resistor 122 coupled between circuit point 120 and a terminal 124 to which an operating voltage $+V_s$ is applied. A capacitor 126 bypasses AC voltages on circuit point 120 to ground. DC current is supplied from circuit point 120 to circuit point 108 by way of an inductor 128, which is usually referred to in deflection systems as the flyback inductance, such as the primary winding of a horizontal output transformer. The circuit so far described corresponds to a horizontal deflection system which operates in a well-known manner.

Briefly, the "deflection switch" comprising transistor 104 and diode 106 is closed for the trace portion of the cycle. This produces a build-up of sawtooth current in deflection winding 114. Retrace of the deflection winding current occurs after transistor 104 is turned off by negative base current from deflection drive generator 102. During this transition, current flow is diverted from transistor 104 collector to retrace capacitor 112. The voltage on circuit point 108 rises at a substantially sinusoidal rate, resonating with the deflection winding reactance for one half cycle. Retrace is completed and trace started when diode 106 is forward biased. This forward biasing closes the "deflection switch" for the first part of the trace portion.

Such a deflection system provides a sawtooth deflection current through deflection winding 114 and a parabolically shaped voltage waveform across S-shaping capacitor 116. However, this parabolically shaped voltage is superimposed on a DC voltage which will not differ much from the supply voltage on circuit point 120. This is so because circuit point 118 is DC coupled to circuit point 120 by way of deflection winding 114 and inductor 128, both of which have low DC resistances. A transformer 130 has one end of its primary winding 132 coupled to circuit point 118 and the other end of primary winding 132 coupled by way of a series coupling of a resistor 134 and a variable resistor 136 to circuit point 120. As previously explained, circuit point 118 and 120 are substantially at the same DC potential. However, circuit point 120, which is bypassed by capacitor 126, is at a substantially constant DC potential, whereas the potential at circuit point 118 exhibits a parabollic variation superimposed on the DC potential. The voltage appearing across primary winding 132 will therefore essentially be that of the parabolically shaped waveform which appears across S-shaping capacitor 160, with substantially no accompanying DC components.

One end of secondary winding 138 is coupled to ground and the other end is coupled by way of a blocking capacitor 140 to a circuit point 142. A focus voltage supply generator 144 also supplies a focus voltage to circuit point 142 by way of a resistor 146. The voltage at circuit point 142 results from a combination of the parabolically shaped voltage appearing across secondary winding 138 and the focus voltage supplied by focus circuit supply generator 144 and is applied to focus voltage utilization means 146 which may, for example, comprise the focus electrode of a television display picture tube. For example, focus voltage supply generator 144 may provide a DC focussing voltage with which the parabolically shaped voltage is summed.

Adjustable resistor 136 provides amplitude adjustment of the parabolically shaped voltage waveform. Some variation in the phase of the parabolically shaped voltage waveform appearing across secondary winding 138 may occur when the resistance of resistor 136 is changed for amplitude adjustment. It has been found that such phase variations can be reduced by coupling a resistor 148 in parallel with primary winding 132.

As explained, no significant amount of DC voltage is applied across primary winding 132 and consequently no significant amount of DC current will flow through the winding, despite the fact that it is coupled to the deflection part of the circuit without the use of a blocking capacitor. Besides saving the cost and space requirements for the capacitor, this permits a relatively small transformer to be used without risk of magnetic saturation of the magnetic core. A smaller transformer is relatively less costly and requires relatively less space.

Clearly, the implementation of the invention in accordance with the described embodiment is illustrative. Various modifications to the circuitry for implementing the invention in accordance with the foregoing description will readily suggest themselves to one skilled in the art. For example, the choice of ground for a common reference potential and the illustrated voltage polarity sense may be modified to suit a particular application. Furthermore, while one end of the secondary winding 138 has been shown as being coupled to ground, it may readily be returned to a source of vertical or frame rate modulation signal instead of ground, so as to provide full dynamic focus correction with regard to both horizontal and vertical deflection. Although focus voltage generator 144 has been illustratively described as supplying a DC voltage, it may instead supply a DC voltage having a modulated focus voltage superimposed. These and other modifications are comtemplated to be within the scope of the present invention.

What is claimed is:

1. In a television deflection circuit including direct current (DC) power supply means, and further including, in parallel combination, a switching transistor, a damper diode, a retrace capacitor and a deflection winding coupled in series with a DC blocking capacitor, and wherein inductance means is coupled between said DC power supply means and said parallel combination for supplying a DC operating potential thereto, such that the average DC potential at the point of series coupling of said deflection winding and said DC blocking capacitor is substantially the same as said operating potential, a focus voltage generating arrangement having scan rate modulation of the focus voltage, comprising:

focus supply means for providing a first focus voltage;

transformer means for coupling signals between primary and secondary windings having substantial DC isolation therebetween, one end of said primary winding being coupled to the point of said series coupling of said deflection winding and said DC blocking capacitor and the other end of said primary winding being coupled to said DC power supply means such that the average DC potential at each end of said primary winding is substantially the same as said operating potential; and signal combining means coupled to said focus supply means and to said secondary winding for providing a second focus voltage having scan rate modulation.

2. The arrangement recited in claim 1 wherein said inductance means comprises an inductor having one end thereof coupled to said DC power supply means for receiving said operating potential and wherein said other end of said primary winding is coupled to said one end of said inductor.

3. The arrangement recited in claim 1 wherein said DC power supply means includes first and second supply points for respectively providing substantially the same supply potential and wherein said inductance means and said other end of said primary winding are coupled to said first and second supply points, respectively.

4. The arrangement recited in claim 2 wherein said DC power supply means includes a common point of reference potential, said parallel combination being coupled between said other end of said inductor and said common point of reference potential.

5. The arrangement recited in claim 4 wherein said transformer means includes a core of magnetic material exhibiting magnetic characteristics susceptible of substantial degradation when subjected to steady magnetization having an intensity greater than a predetermined value and wherein said inductance exhibits a sufficiently small DC resistance such that a direct current produced in said primary winding is of smaller magnitude than the magnitude required for causing said predetermined intensity value of steady magnetization.

6. The arrangement recited in claim 4 wherein said transformer windings are wound on a core of magnetic material exhibiting magnetic characteristics susceptible of significant degradation when subjected to a steady magnetization having an intensity greater than a predetermined value and wherein a direct current component flowing in said primary winding is of smaller magnitude than the magnitude required for causing said substantial degradation.

7. The arrangement recited in claim 1 wherein said scan rate corresponds to a television line scan rate.

8. The arrangement recited in claim 7 wherein said first focus voltage exhibits scan rate modulation at a scan rate corresponding to a television frame scan rate.

9. The arrangement recited in claim 8 wherein said signal combining means comprises a resistor signal summing network.

10. The arrangement recited in claim 9 wherein said second focus voltage is applied to the focusing electrode of a television picture tube.

11. The arrangement recited in claim 1 further including resistance means coupled in parallel with said primary winding.

12. The arrangement recited in claim 11 wherein said other end of said primary winding is coupled to said DC power supply means by way of variable resistance means.

13. The arrangement recited in claim 7 wherein said secondary winding is further coupled to a source of television frame scan rate signal.

* * * * *